United States Patent Office 3,208,816
Patented Sept. 28, 1965

3,208,816
METHOD OF DISSOLVING CERAMICS CONTAINING BERYLLIA
Benedict L. Vondra, Jr., Greensburg, Pa., assignor to Nuclear Materials and Equipment Corporation, Apollo, Pa., a corporation of Pennsylvania
No Drawing. Filed Dec. 8, 1961, Ser. No. 158,099
11 Claims. (Cl. 23—14.5)

This invention relates to the art of separating materials and has particular relationship to the derivation of selected components from highly refractory materials. Such highly refractory materials are called ceramics in this application and include combinations, mixtures or solid solutions of certain oxides and certain borides. These ceramics are referred to as refractory because they are highly resistant to chemical and physical treatment and particularly resist solution in the available solvents even those that are highly corrosive such as hydrofluoric acid and aqua regia. Specific ceramics with which this invention concerns itself are combinations, mixtures or solid solutions of one or more of the class consisting of uranium oxides ($UO_2$, $UO_3$ or $U_3O_8$), beryllium oxide (BeO), zirconium oxide ($ZrO_2$), aluminum oxide ($Al_2O_3$), zirconium boride ($ZrB_2$) and titanium boride ($TiB_2$).

An important ceramic with which this invention in its specific aspects concerns itself is a combination, mixture or solid solution of BeO and $UO_2$, $UO_3$ or $U_3O_8$ which may be stabilized by the addititon of other oxides such as $ZrO_2$. The word "stabilized" as used here means that the refractory properties of the ceramic are increased. A stabilized ceramic is more highly resistant to treatment than one that is unstabilized. Another such important ceramic is beryllium oxide along which is very difficult to dissolve by prior are methods.

The BeO-U oxide ceramic may exist as a green powder, as a low-fired solid or as a high-fired solid. The powder consists of a blend of the oxides with a hydrocarbon binder. The low-fired ceramic consists of a solid produced by heating the powder to about 800° C. to 900° C. to burn out the binder. A high-fired ceramic consists of a solid produced by sintering the powder or low-fired ceramic at about 1700° C. to 1800° C. The powder or the low or high-fired ceramic may be stabilized.

It is frequently desirable to derive from a ceramic one or more of its components which may be of strategic or economic importance. Typically, it may be desirable to derive uranium from the above described BeO-U oxide ceramic.

It is an object of this invention to provide a method for readily deriving selected components from a ceramic. It is a further object of this invention to reduce a ceramic to a condition in which selected components may be readily derived therefrom by a continuous process. It is a specific object of this invention to provide such a method for, and to so reduce, the ceramic composed of a combination, mixture or solid solution of beryllium oxide and uranium oxide with or without stabilizers, and also beryllium oxide alone.

Selected components are readily derived from a material by dissolving the material and separating out the components. But ceramics have tenaciously resisted attempts to dissolve them in accordance with the teachings of the prior art. The following Table I shows the results obtained in attempting to dissolve BeO-$U_3O_8$ ceramics with a number of powerful solvents.

TABLE I

| Expt. No. | Conditions and Solvent | Wt.—Solute Initial | Wt.—Solute Final | Time of Treatment | Wt. U in Extract | Calc. Wt. U by Wt. Loss |
|---|---|---|---|---|---|---|
| 3–30 | 35 ml. con. $HNO_3$, 25 ml. 48% HF/100 boiling soln. | 1.23 g., Rod | 0.92 g | 6½ hrs | | |
| 3–40 | 20 g. NaOH in iron crucible at 800° C | 0.89 g., Rod | 0.86 g | 3¾ hrs | | |
| 4–15 | 20 g. $Na_2CO_3$ in platinum crucible at 900° C. | 0.86 g., Rod | 0.86 g | 17 hrs | | |
| 4–24 | 20 g. $NH_4HF_2$ in iron crucible fused on hot plate. | 0.68 g., Rod | 0.31 g | 2 hrs | | |
| 4–38 | 20 g. $NH_4HF_2$ in iron crucible fused on hot plate. | (a) 1.82 g., Pdr (b) 3.63 g., Pdr | 0.35 g 1.60 g | 2½ hrs 2½ hrs | | |
| 5–2 | 100 ml. 8% HF at boiling point of soln | 1.01 g., Pdr | 0.31 g | 2 hrs | 0.032 g | 0.031 g. |
| 5–6 | 12 ml. conc. $H_2SO_4$, 16 ml. 48%HF/100 ml. at boiling point. | 1.00 g., Pdr | 0.11 g | 4 hrs | 0.020 g | 0.040 g. |
| 5–32 | 100 ml. 48% HF at boiling pt. of soln | 1.00 g., Pdr | 0.04 g | 2 hrs | | 0.018 g. |
| 5–44 | 100 ml. 20% HF at boiling pt. of soln | 1.00 g., Pdr | 0.17 g | 2 hrs | | |
| 6–9 | 24 ml. con. $H_2SO_4$, 48 ml. 48% HF/100 ml. | 5.00 g., Pdr | 0.35 g | 2 hrs | 0.21 g | 0.20 g. |
| 6–14 | 20 g. $NH_4HF_2$ in iron crucible fused on hot plate. | 5.44 g., Rod | 4.94 g | 2 hrs | | |
| 6–33 | Extraction with boiling 2M $Be(NO_3)_2$ soln. | 15.00 g., Pdr | 11.92 g | 64 hrs | 0.83 g | 0.13 g. |
| 7–10 | 56 ml. conc. $H_2SO_4$, 44 ml. 48% HF/100 ml. at boiling pt. of soln. | 5.00 g., Pdr | 0.00 | 2 hrs | 0.31 | 0.22 g. |
| 7–26 | 28 ml. conc. $H_2SO_4$, 22 ml. 48% HF/100 ml. at boiling pt. of soln. | 5.00 g., Pdr | 0.51 | 2 hrs | 0.20 | 0.20 g. |
| 7–36 | 56 ml. conc. $H_2SO_4$, 44 ml. 48% HF/100 at boiling pt. of soln. | 10.00 g., Pdr | 0.26 g | 2 hrs | 0.40 | 0.40 g. |
| 8–2 | 50 ml. conc. $HNO_3$, 50 ml. 48% HF/100 ml. at boiling pt. of soln. | 5.00 g., Pdr | 0.86 | 2 hrs | | 0.18 g. |

The letter "M" in the second column of the table indicates molarity. The letter "g." in the third column means grams; the word "Rod" means that the ceramic was in rod form; the word "Pdr" means that ceramic was powdered. The proportion of $U_3O_8$ in the ceramic was only about 5 to 10%. This explains the low magnitudes of the quantities in the sixth and seventh columns. (For example, in Experiment 5-2, .032 g. or .031 g. uranium.)

Several items in the table show effective solution of the ceramics but in some of these cases the solvents are not conveniently useable and in the same cases and others, the results could not be repeated. For example, in Experiment 7-36, 10 grams of powder was, to a large extent, dissolved; but concentrated $H_2SO_4$ and 48% HF is not a readily useable solvent. $NH_4HF_2$ is not only difficult to use but costly. Both solvents require vessels of materials capable of withstanding their corrosive action such as highly resistant ceramic or carbon. Such materials are available for laboratory-scale operation but not for industrial operations.

It is then another object of this invention to provide a solvent for reliably dissolving highly refractory ceramics, and particularly beryllium oxide-uranium oxide ceramics, which method shall be useable on an industrial-scale and an incidential object of this invention is to provide a solvent for readily dissolving such highly refractory ceramics.

This invention arises from the discovery that mercury or silver in small quantities operates as a highly effective catalyst in producing solution of the highly refractory ceramics in the available solvents such as one or more of hydrochloric acid, hydrofluoric acid (or other halogen acids), nitric acid, and sulfuric acid. The mercury or silver operates to speed up the rate of solution to such an extent that substantial effervecence or foaming is produced and the speed must be controlled. Substantial quantities of ceramic both stabilized and unstabilized can be dissolved in a short time interval of the order of thirty minutes. Typically, the solution may be carried out effectively in a solvent such as hydrofluoric acid alone. Such materials as polyethylene, polypropylene and other chemical and heat resistant plastics (fluorinated hydrocarbon plastics—Teflon) resist this solvent (HF) and the solution can be readily carried out on an industrial scale in such vessels. While the use of the hydrofluoric acid with the mercury catalyst constitutes an important inventive concept because of its ready industrial utility and its effectiveness, other solvents and the silver catalyst also have industrial applicability and may be used. The effect of the mercury in speeding the solution reaction of ceramics with the other solvents than HF and the use of silver as a catalyst is within the broader scope of this invention.

It has also been discovered that the effectivness of the solution reaction is improved materially by reducing the ceramic to a fine powder of 100 mesh or finer. Powder of 200 to 350 mesh has been found highly effective. In addition, the reacting material should be brought to a moderate temperature of about 60° C. The solution reaction is exothermic and once it starts, develops substantial heat. It is desirable that during the reaction the temperature should be maintained between about 105° C. and 110° C.

In accordance with the specific aspects of this invention then, the ceramics are dissolved by subjecting the material in finely divided form to a solvent such as one or more of the above listed acids in the presence of a small quantity of mercury or silver. The mercury or silver may be added as the metal alone or as a compound of the metal such as a chloride or a nitrate. The ceramic powder is usually reduced to a slurry by mixing about 200 to 400 grams of the powder in about a liter of water. The mercury or silver may be added to this slurry and may be as low as .01 molar concentration (M). Typically, 1 gram of mercury-nitrate crystals may be added per liter of solution in the slurry. Higher quantities of mercury may be added. An increase in the mercury increases the speed of reaction. The use of more than two grams of mercury per liter would in many cases produce no useful result. For this quantity the reaction reaches the highest speed desired.

A typical process is applied to a material such as the BeO-UO$_2$ ceramic either stabilized or unstabilized. This ceramic as received is in the form of solid pieces.

These pieces may be treated as follows:

*Operating procedure*

(a) *Comminution*: (1) The pieces are placed in a jaw crusher and after crushing, allowed to flow into a hammer mill and powdered. The powder should be about 300 mesh. (2) The powder is moistened by water and when finished the resulting slurry should contain about 400 g. powder per liter.

(b) *Catalysis*: The slurry is placed in a dissolving container and about ½ gram per liter of slurry of crystalline mercuric nitrate Hg(NO$_3$)$_2$·H$_2$O is added.

(c) (1) The slurry and mercury are stirred while being heated to about 60° C. to expedite the reaction. (2) 70% HF is added dropwise. As this acid is added the temperature of the solution starts rising and at approximately 90° C. a vigorous reaction occurs raising the temperature to 105° C. to 110° C. The addition of HF is stopped at the first sign of this reaction. Then when the reaction begins to slow, the addition of the remaining HF with the equivalent of another ½ gram of mercuric nitrate is continued until one liter of the HF has been added for each liter of slurry, yielding a concentration of 200 g. BeO-UO$_2$ per liter.

If the reaction is too vigorous some of the mixture could boil over. This may be prevented by the rapid addition of about 50 ml. of water per liter of solution. (3) The heating and stirring of the mixture is continued for approximately 15 minutes after all HF has been added, maintaining a temperature above 85° C. At this point the ceramic is dissolved.

In the case of beryllium oxide-uranium oxide material it is one of the important ultimate specific objects of this invention to separate the beryllium and the uranium which are in solution. This is accomplished by liquid extraction of one of the components (uranium usually) in a liquid solvent (usually organic) which is immiscible in the aqueous solution. Such solvents may be tributylphosphate (TBP) which is usually diluted in another organic solvent and methyl-isobutyl-ketone (Hexone). The uranium is soluble in the organic solvent but in its hexavalent and not in its quadrivalent state. But the solution includes the uranium in the quadrivalent state as UF$_4$.

In the practice of this aspect of the invention the uranium is converted to the hexavalent state by oxidation. A nitrate is then added to produce UO$_2^{++}$ and NO$_3^-$ ions; and then the uranium is extracted as UO$_2$(NO$_3$)$_2$·2TBP when the TBP is added. Similarly conversion takes place for other organic extract compounds.

A typical uranium derivation process is as follows—

(a) *Oxidation*: 15 ml. H$_2$O$_2$ per liter of solution is added and heating and stirring is continued until solution turns yellow and clears. (Approx. 30 min.)

(b) *Filtration*: Solution is pumped through filter.

(c) *Feed preparation*: Soltuion from the filter is pumped into extraction stage mixing with an equal volume of 2 Molar Al(NO$_3$)$_3$. This in turn is mixed with 3 Molar HNO$_3$ in a 3-1 ratio yielding a feed solution that is 0.75 M Al(NO$_3$)$_3$, 0.75 HNO$_3$ and contains approximately 4-6 g. U per liter.

(d) *Separation*: The uranium may be decanted or drawn off in any suitable manner.

The above described process has the disadvantage that the aluminum remains in solution with the beryllium and is not readily separable from the beryllium and it is one of the specific objects of this invention to provide a separation process in which the beryllium shall be derivable in its relatively pure form.

In accordance with this aspect of this invention, the Al(NO$_3$)$_3$ is replaced by beryllium nitrate, Be(NO$_3$)$_2$; that is essentially NO$_3^-$ ions are derived from Be(NO$_3$)$_2$ rather than Al(NO$_3$)$_3$. The Be(NO$_3$)$_2$ has been found to operate highly satisfactorily and does not involve the problem of subsequently separating out aluminum. This complexing of the uranium may be understood by considering the reactions which take place as the solution is converted.

The solution initially includes UO$_2$, F$_2$, UF$_4$, BeF$_4$, H$^+$ ions, and H$_2$O. An oxidizer such as H$_2$O$_2$ or KMnO$_4$ may be added. This has the effect of converting the uranium to the hexavalent state. The reaction which takes place may be defined as follows:

$$UF_4 + 2H_2O_2 = UO_2^{++} + 4F^- + 2H_2O$$

The solution now contains:

$$UO_2^{++}, 4F^-, BeF_4^{--}, H^+, H_2O$$

The addition of the Be(NO$_3$)$_2$ produces 2NO$_3^-$ ions per molecule and with the addition of an organic liquid such as TBP the uranium is extracted in the organic liquid as uranyl nitrate-TBP complex, for example $$UO_2(NO_3)_2 \cdot 2TBP$$

The Be(NO$_3$)$_2$ is not only advantageous as a salting agent to take up the uranium but also is advantageous in complexing the fluoride in applications such as the above-described.

The following are examples of the practice of this invention carried out since its conception.

EXAMPLE I

A slurry of two hungred grams of beryllium oxide-uranium oxide powder in one liter of water was totally dissolved in two hours in 48% HF with a small but effective quantity of $HgCl_2$ present in the solvent. The solution was then contacted with about 20% $H_2O_2$ and then the uranium was ozidized by alternate additions of $HNO_3$ and $H_2O_2$. A clear liquid resulted.

EXAMPLE II

A sample of random sized beryllium oxide-uranium oxide low-fired ceramic was treated. Initially 100 ml. of 48% HF was added. There was a heavy reaction for about 45 minutes which receded but only a small portion of the sample was dissolved. Then $HgCl_2$ was added and 50 ml. of 48% HF was added. The sample was at least 95% dissolved. The solution was oxidized with 50 ml. of $HNO_3$ and extracted by solvent extraction.

EXAMPLE III

Two to three grams of powdered pieces of beryllium oxide-uranium oxide ceramic was dissolved in 75 ml. of 48% HF plus 2 grams of $HgCl_2$. After several hours heating the sample was filtered and the filtrate and residue analyzed for uranium. The filtrate had 1.3 mg. U per cc. The residue very slight trace to no uranium.

EXAMPLE IV 20 gm. of $BeO-U_3O_8$ powder dissolved in 100 ml of 48% HF plus 0.5 gm. of $HgCl_2$. Approximately 15% undissolved after 1 hour. Less than about 2% remained undissolved after 2 hours total treatment in same acid.

EXAMPLE V.—METHOD

It was desirable to determine the lowest HF concentration that would give the highest concentration of U in the shortest reaction time. Using $Hg(NO_3)_2 \cdot H_2O$ crystals as a catalyst this was accomplished by adding varying amounts of the beryllium-uranium oxides to 24%, 36% and 48% HF solution, noting the time and the results of reaction. During the trials it was determined the particle size of the powdered pieces should not exceed 100 mesh for *best* results in dissolving.

It was then desirable to find the most efficient method of salting the solution with $NO_3^-$, complexing the $F^-$ and oxidizing any $U^{++++}$ present. This was accomplished by:

(a) Holding the amount of $Al(NO_3)_3$ constant and varying the amounts of $HNO_3$ added.
(b) Holding the $HNO_3$ constant and varying the amounts of $Al(NO_3)_3$ added.
(c) Changing the times allowed for oxidation.
(d) Alternate addition of $HNO_3+H_2O_2$ at different solution temperatures; both with and without $Al(NO_3)_3$ present.
(e) Addition of $Be(OH)_2$ in place of $Al(NO_3)_3$, to Be solutions with various concentrates of $HNO_3$.
(f) Use of $KMnO_4$ in place of $H_2O_2$.
(g) Variation of extraction methods, i.e., use of 15% TBP and 20% TBP in kerosene; No. of extraction stages required.

RESULTS (1) The most advantageous ceramic-to-HF conc.=20 g./100 ml. of about 35% HF with a minimum of 0.4 g. $Hg(NO_3)_2 \cdot H_2O$ crystal as a catalyst.

(2) Application of low heat reduces the time needed for the reaction to start. It then proceeds vigorously for a few minutes reaching 110° C. after which it reacts more slowly. Temperature must be maintained at about 80° C.–90° C. to complete the dissolution.

(3) $KMnO_4$, as compared to $H_2O_2$, seems to be the more efficient oxidizing agent. A concentration of 0.5 to 1.0 g. is sufficient to oxidize the uranium.

(4) If $Al(NO_3)_3$ is added, a concentration of 3 M $HNO_3$ proves adequate, but if $Be(OH)_2$ is used a higher concentration is needed.

(5) A concentration of 15% TBP (in kerosene) on three contacts with the feed was sufficient to lower the U concentration from approx. 10 mg./ml. to less than .01 mg./ml.

EXAMPLE VI.—PURPOSE OF THE WORK (1) To reduce concentration of HF needed to dissolve ceramic powder;
(2) To reduce, if not eliminate, $HNO_3$ needed;
(3) To use $Be^{++}$ as complexing ion rather than $Al^{+++}$ to make possible more ready recovery of Be;
(4) To improve purity of the final product.

*Method for 1.*—A slurry of 200 grams of $BeO-UO_2$ powder per liter of water was produced and catalyst (Hg) added. HF was added dropwise to the mixture until a concentration of 30% HF was reached. The mixture heated while stirring for 30 min. after all reaction had ceased. $KMnO_4$ was added and, after allowing resulting solution to stand overnight, approx. 10% of the powder was left undissolved. It was concluded that the HF concentration should be increased to at least about 35%.

*Method for 2.*—A plurality of solutions of $BeO-UO_2$ powder were prepared from slurries each of 200 grams powder in a liter of water and the experiments tabulated in Table II below conducted. Each separate experiment number in Table II indicates a separate dissolving step; a subletter following the number indicates the same starting solution but a different treatment.

TABLE II

| Expt. No. | Reagents Added | Result |
|---|---|---|
| H-Be-25 | 3M $HNO_3$, 0.5M $Al(NO_3)_3 \cdot 9H_2O$. | U before extracting=8.8 mg./ml. After 3 passes with about 20% TBP=3.3 mg/ml. |
| H-Be-26 | 1.0M $Al(NO_3)_3 \cdot 9H_2O$ | U before extraction=8.5 mg./ml. After 3 passes with 20% TBP=1.02 mg./ml. |
| H-Be-26a | 1.0M $Al(NO_3)_3 \cdot 9H_2O$ | Two more passes=0.01 mg./ml. |
| H-Be-26b | 1.0M $Al(NO_3)_3 \cdot 9H_2O$ and 3M $HNO_3$. | After 3 passes —20% TBP=1.4 mg./ml. |
|  | 1.0M $Al(NO_3)_3$ added | After 2 passes —20% TBP=less than .01 mg./ml. |
| H-Be-27 | 2M $Al(NO_3)_3 \cdot 9H_2O$ | U before extraction=6.4 mg./ml. After 3 passes —15% TBP=0.01 mg./ml. |
| H-Be-27a | 1M $Al(NO_3)_3$ solution and 3M $HNO_3$. | After 3 passes —15% TBP=0.012 mg./ml. |
| H-Be-29 | 1M $Al(NO_3)_3$ solution and 2M $HNO_3$. | U before extraction=6.3 mg./ml. After 3 passes —15% TBP=0.14 mg./ml. |
| H-Be-29a | 1M $Al(NO_3)_3$ solution and 3M $HNO_3$. | U before extraction=6.28 mg./ml. 3 passes —15% TBP=0.42 mg./ml. |
| H-Be-29b | 1M $Al(NO_3)_3$ solution | U before extraction=6.2 mg./ml. 3 passes —15% TBP <0.01 mg./ml. |
| H-Be-29c | 1M $Al(NO_3)_3$ solution | U before extraction=6.2 mg./ml. 3 passes —15% TBP <0.01 mg./ml. |

In the experiments H-Be-25 through H-Be-27 (excepting H-Be-27a) crystalline $Al(NO_3)_3 \cdot 9H_2O$ was added directly. In all cases after standing not less than 1 hour the resulting solution salted out. In all further experiments $Al(NO_3)_3$ is added as a solution.

*Method for 3.*—In attempting to determine the feasibility of using $Be^{++}$ ions, the above solution H-Be-29 of the Method for 2 was used. The results are shown in Table III below.

TABLE III

| Expt. No. | Concentrations | Results |
|---|---|---|
| H-Be-29d | 0.5M $Be(OH)_2$ solution and 4.0M $HNO_3$. | U before extr.=6.2 mg./ml. After 3 passes −15% TBP=1.5 mg./ml. |
| H-Be-29e | 1.0M $Be(OH)_2$ and 4M $HNO_3$. | U before extr.=6.14 mg./ml. After 3 passes with 15% TBP=0.43 mg./ml. |
| H-Be-29f | 2.0M $Be(OH)_2$ and 4.0M $HNO_3$. | U After 3 passes with 15% TBP=0.09 mg./ml. U after 5 passes with 15% TBP <0.01 mg./ml. |
| H-Be-29g | 2.0M $Be(OH)_2$ and 4.0M $HNO_3$. | U after 4 passes with 15% TBP <0.01 mg./ml. |

*Method for 4.*—In attempting to improve the purity a new solution of $BeO$-$UO_2$ was used. The results are shown in Table IV.

TABLE IV

| Expt. No. | Extraction Conditions | Results |
|---|---|---|
| H-Be-30a | 1M $Al(NO_3)_3$ | $U_3O_8$ contained 5-15 parts per million Be. |
| H-Be-30b | 0.5M $Al(NO_3)_3$ and 1.5M $HNO_3$. | $U_3O_8$ contained 5-15 parts per million Be. |
| H-Be-30c | 2M $Be(OH)_2$ and 4M $HNO_3$. | $U_3O_8$ contained 5-15 parts per million Be. |
| H-Be-30d | 5M HF and 1M $Al(NO_3)_3$ | $U_3O_8$ contained 5-15 parts per million Be. |

Conclusions

Based on the above results and the data contained in the earlier work, the procedure for the recovery of U from beryllium oxide-uranium oxide ceramics should incorporate these features.

(1) Ceramics should be powdered to at least 100 mesh;
(2) The slurry should be heated to 60° C. and $Hg(NO_3)_2$ added. The amount added should be about 4 grams per liter but in larger batches this could probably be reduced.
(3) The concentration of ceramic should not exceed about 200 g./l. Since a final concentration of 35% HF is required, the slurry should be made up to 400 g./l. and by the slow addition of 70% HF, brought to the required concentration. This also enables the rate of reaction to be controlled.
(4) Even after the required amount of HF has been added and all bubbling ceases, it is necessary to maintain a temperature of at least 80° C. for a short time to complete the dissolution.
(5) During dissolution the mixture should be stirred continuously.
(6) Before the mixture is removed from heat and with continuous stirring, $KMnO_4$ should be added, until a pink color persists. This amount varies. The amount used in these experiments usually averaged about 2g. $KMnO_4$ per 100 g. of dissolved ceramic.
(7) Filter.
(8) The solution at this point can be treated one of two ways before extraction:
 (a) Make the solution 1 M $Al(NO_3)_3$ by the addition of a 2 M solution of $Al(NO_3)_3$, or,
 (b) Make the solution 2 M $Be(OH)_2$, 4 M $HNO_3$ by the addition of a 4 M $Be(OH)_2$ solution in 8 M $HNO_3$.
(9) Extract.

EXAMPLES VII 20 g. of high-fired $BeO$-$UO_2$ powder was slurried with 50 ml. of $H_2O$ and heated to about 80° C. 0.3 g. $AgNO_3$ crystal was added and after 5 minutes 50 ml. of 70% HF was added slowly. This mixture reacted vigorously for about 3-4 minutes then almost stopped. A few additional crystals of $AgNO_3$ were added and this reactivated the reaction. After about 5 minutes of heating and stirring a few more crystals of $AgNO_3$ were added. No further reaction occurred indicating completion of dissolution. A few ml. of $H_2O_2$ was added and solution turned greenish-yellow indicating oxidation of any $UF_4$ formed to $U^{+6}$. All of the original sample was in solution except for a few of the larger pieces.

While preferred embodiments of this invention have been disclosed herein, many modifications thereof are feasible. This invention then is not to be restricted except insofar as is necessitated by the spirit of the prior art.

This invention in its broader aspects is applicable to the ceramics comprising one or more of the class consisting of beryllium oxide, uranium oxide, zirconium oxide, aluminum oxide, zirconium boride and titanium boride. But it is emphasized that stabilized or unstabilized combinations, mixtures, or solid solutions of beryllium oxide and uranium oxide, beryllium oxide alone were prior to this invention found very difficult to dissolve by prior art methods and the dissolution of the latter material constitutes an important specific aspect of this invention.

I claim as my invention:

1. The method of dissolving a chemically highly-stable ceramic comprising beryllium oxide and at least one of the class consisting of uranium oxide, zirconium oxide, aluminum oxide, zirconium boride, and titanium boride, the said method comprising reducing said ceramic to a powder of at least 100 mesh, producing an aqueous slurry of said powder, adding to said slurry the equivalent of about .01 mole of mercury, preheating said slurry to about 60° C., and adding hydrofluoric acid of concentrations between 30% and 70% slowly to said slurry and mercury.

2. The method of dissolving a chemically highly-stable ceramic comprising beryllium oxide and at least one of the class consisting of uranium oxide, zirconium oxide, aluminum oxide, zirconium boride, and titanium boride, the said method comprising reducing said ceramic to a powder of at least 100 mesh, producing an aqueous slurry of said powder, adding to said slurry the equivalent of about .01 mole of mercury, preheating said slurry to about 60° C., and adding hydrofluoric acid of concentration between 30% and 70% slowly to said slurry and mercury while maintaining the temperature of said slurry, mercury and acid at about between 105° C. and 110° C. until a solution is formed.

3. The method of dissolving a chemically highly-stable ceramic comprising beryllium oxide and at least one of the class consisting of uranium oxide, zerconium oxide, aluminum oxide, zirconium boride, and titanium boride, the said method comprising reducing said ceramic to a powder of at least 100 mesh, producing an aqueous slurry of said powder, adding to said slurry the equivalent of about .01 mole of mercury, preheating said slurry to about 60° C., and adding a concentrated acid at least one of the class consisting of hydrofluoric acid, hydrochloric acid, nitric acid, and sulfuric acid to said slurry and mercury.

4. The method of dissolving a chemically highly-stable ceramic comprising beryllium oxide and at least one of the class consisting of uranium oxide, zirconium oxide, aluminum oxide, zirconium boride and titanium boride, the said method comprising reducing said ceramic to a powder, producing an aqueous slurry of said powder, and adding to said slurry a concentrated acid comprising at least one of the class consisting of hydrofluoric acid, hydrochloric acid, nitric acid and sulfuric acid to effect solution, the said method being characterized by the presence during the dissolving process of a catalyst comprising a small but effective quantity of at least one of the class consisting of mercury and silver.

5. The method of dissolving a chemically highly-stable ceramic comprising beryllium oxide and at least one of the class consisting of uranium oxide, zirconium oxide, aluminum oxide, zirconium boride, and titanium boride the said method comprising producing a slurry of said ceramic, and adding to said slurry a concentrated acid comprising at least one of the class consisting of hydrofluoric acid, hydrochloric acid, nitric acid and sulfuric acid to effect solution, the said method being characterized by the presence during the dissolving process of a catalyst comprising a small but effective quantity of at least one of the class consisting of mercury and silver.

6. The method according to claim 5 characterized by that to control the solution reaction the catalyst is added in two steps, one portion of the required quantity being added to the slurry and the remaining portion being dissolved in at least a portion of the acid and by that at least said portion of said acid is added gradually.

7. The method of dissolving a chemically highly stable ceramic comprising essentially a combination, mixture or solid solution of beryllium oxide and uranium oxide which comprises treating said ceramic with a solvent including a concentrated acid and a small but effective amount of at least one of the class consisting of mercury and silver.

8. The method of dissolving a chemically highly stable ceramic comprising essentially berryllium oxide which comprises treating said ceramic with a solvent including a concentrated acid and a small but effective amount of at least one of the class consisting of mercury and silver.

9. The method according to claim 5 characterized by that the ultimate concentration of the acid added is at least 35%.

10. The method of claim 4 for dissolving a ceramic including a refractory-property increasing stabilizer.

11. The method of claim 5 for dissolving a ceramic including a refractory-property increasing stabilizer.

References Cited by the Examiner

UNITED STATES PATENTS

| | | | |
|---|---|---|---|
| 2,900,230 | 8/59 | Larsen et al. | 23—14.5 |
| 2,901,343 | 8/59 | Peterson | 23—14.5 |
| 3,004,051 | 10/61 | Hillyer et al. | 23—14.5 |
| 3,046,087 | 7/62 | Bruce | 23—14.5 |

OTHER REFERENCES

Progress in Nuclear Energy, Series III, vol. 1, 1956, pp. 126–129, 86–90, and 217–219.

AEC Document TID–7534, May 1957, pp. 211–217.

AEC Document ORNL–2519, Nov. 14, 1958, pp. 4 and 8.

Flagg, Chemical Processing of Reactor Fuels, May 1961, pp. 89–97 and 117.

CARL D. QUARFORTH, *Primary Examiner.*